(12) United States Patent
Chang et al.

(10) Patent No.: US 11,175,822 B2
(45) Date of Patent: Nov. 16, 2021

(54) TOUCHSCREEN WITH GROUP FILTERING

(71) Applicant: THE REGENTS OF THE UNIVERSITY OF CALIFORNIA, Oakland, CA (US)

(72) Inventors: Mau-Chung Frank Chang, Los Angeles, CA (US); Li Du, San Diego, CA (US); Chunchen Liu, La Jolla, CA (US); Yan Zhang, Sherman Oaks, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 198 days.

(21) Appl. No.: 16/183,983

(22) Filed: Nov. 8, 2018

(65) Prior Publication Data
US 2019/0146609 A1 May 16, 2019

Related U.S. Application Data

(63) Continuation of application No. PCT/US2017/032036, filed on May 10, 2017.

(60) Provisional application No. 62/335,593, filed on May 12, 2016.

(51) Int. Cl.
G06F 3/0488 (2013.01)
G06F 3/041 (2006.01)
G06F 3/044 (2006.01)

(52) U.S. Cl.
CPC ........ G06F 3/04883 (2013.01); G06F 3/0443 (2019.05); G06F 3/0446 (2019.05); G06F 3/04166 (2019.05); G06F 2203/04101 (2013.01); G06F 2203/04104 (2013.01)

(58) Field of Classification Search
CPC ............... G06F 3/0416; G06F 3/04883; G06F 2203/04101; G06F 2203/04104; G06F 3/04166; G06F 3/0443; G06F 3/0446
See application file for complete search history.

(56) References Cited

U.S. PATENT DOCUMENTS

| 8,519,965 | B2 | 8/2013 | Cady |
| 9,223,337 | B2 | 12/2015 | Weiping |
| 2009/0267903 | A1 | 10/2009 | Cady |
| 2010/0295813 | A1 | 11/2010 | Kent |
| 2011/0025638 | A1* | 2/2011 | Salaverry .............. G06F 3/0443 345/174 |

(Continued)

FOREIGN PATENT DOCUMENTS

| WO | 2015138984 A1 | 9/2015 |
| WO | 2017197041 A1 | 11/2017 |

OTHER PUBLICATIONS

ISA/US, United States Patent and Trademark Office (USPTO), International Search Report and Written Opinion dated Sep. 6, 2017, related PCT international application No. PCT/US2017/032036, pp. 1-11, claims searched, pp. 12-19.

Primary Examiner — Kenneth Bukowski
(74) Attorney, Agent, or Firm — O'Banion & Ritchey LLP; John P. O'Banion

(57) ABSTRACT

A low-cost single-layer mobile touch-screen is disclosed, including a highly sensitive capacitive sensing circuit, and a corresponding finger 3D position estimation and gesture recognition algorithms compatible with mobile device platforms and that can be readily programmed into the mobile device's application processor.

28 Claims, 12 Drawing Sheets

(56) References Cited

U.S. PATENT DOCUMENTS

2014/0292715 A1 10/2014 Tzu-Wei
2015/0092121 A1 4/2015 Yao-Chin
2015/0109242 A1* 4/2015 Wei ..................... G06F 3/0416
 345/174

* cited by examiner

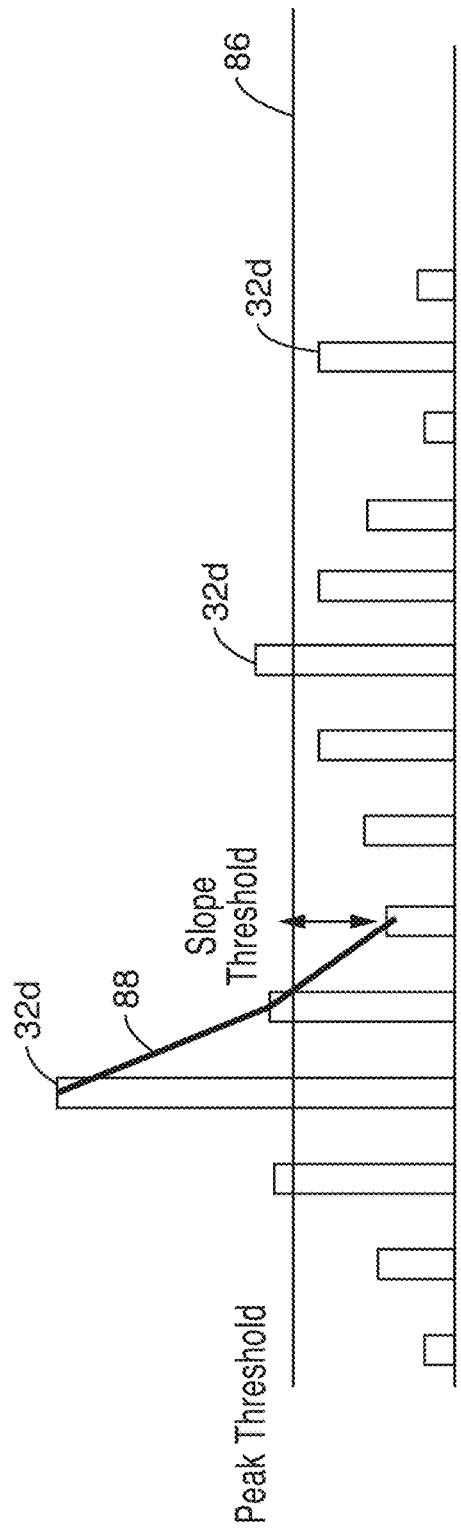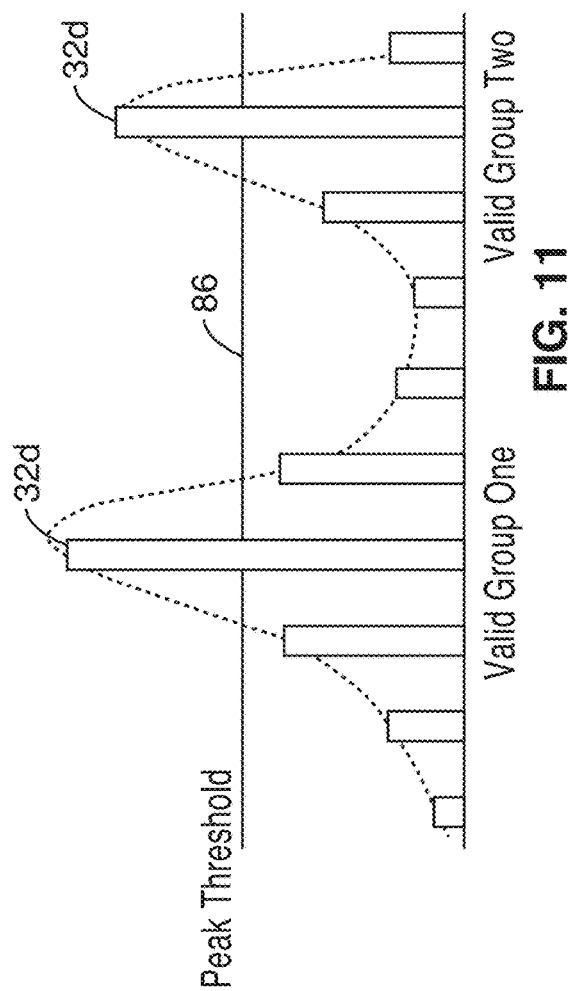

TOUCHSCREEN WITH GROUP FILTERING

CROSS-REFERENCE TO RELATED APPLICATIONS

This application claims priority to, and is a 35 U.S.C. § 111(a) continuation of, PCT international application number PCT/US2017/032036 filed on May 10, 2017, incorporated herein by reference in its entirety, which claims priority to, and the benefit of, U.S. provisional patent application Ser. No. 62/335,593 filed on May 12, 2016, incorporated herein by reference in its entirety. Priority is claimed to each of the foregoing applications.

The above-referenced PCT international application was published as PCT International Publication No. WO 2017/197041 A1 on Nov. 16, 2017, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to sensing surfaces, and more particularly to systems and methods for accurate touch-sensor detection.

2. Background Discussion

The use of smart mobile devices (e.g., smart phones, tablets) has grown rapidly in the past years and is quickly replacing the traditional personal computer (PC). Compared with PCs, smart mobile devices offer comparable computation power with a much smaller size, lower weight and more user-friendly interactive human/machine interface (HMI).

Among these consumer electronics, touch screens have been widely used as the main methodology to bridge the human and machine interaction. Traditional touch screen systems are limited to two-dimensional sensing capability, i.e. users are required to touch the screen directly for the system to determine finger position. This technology suffers from various disadvantages, including leaving fingerprints on the screen, unresponsiveness to wet hands and a limited accuracy with shrinking device size. Moreover, the limited sensing dimension has also trapped the development of advanced interactive games. Unlike in large television and monitor type displays where there is sufficient power to support cameras to detect user's hand motion, the sensing approach in mobile and wearable devices is very limited due to their restricted power and area budget. Therefore, it is important to discover a new method of HMI to have a higher efficiency and increased sensing capabilities.

A conventional touch screen is designed with both horizontal and vertical electrodes. When the user's finger touches or gets close to the electrodes, a certain channel response is shown on the corresponding channel's readout. However, there is also unexpected response due to channel coupling effects and body-induced background capacitance. This unexpected channel response can cause a false detection or affect finger position estimation accuracy.

Currently available 2D capacitive touch sensing can generally be categorized as either self-capacitive sensing or mutual-capacitive sensing. For self-capacitive sensing, the sensor senses finger induced self-capacitance change to the shielded electrodes. With mutual capacitive sensing, the change is shown on the coupling capacitance between horizontal and vertical electrodes. Although the parasitic mutual capacitance of the touch electrode is generally much larger than the self-capacitance, mutual capacitive sensing is still widely used as the main 2D touch sensing methodology in the mobile industry due to its compatibility of implementing multi-touch detection. For self-capacitive sensing, multi-touch detection cannot be supported due to the potential generation of ghost points during the electrode scanning.

BRIEF SUMMARY

This present disclosure is directed to technology that can be used to overcome inaccurate operation of conventional touch screens due to unexpected channel response from factors such as channel coupling effects and body-induced background capacitance. The technology of the present disclosure is configured to accommodate the space and battery constraints of mobile device environment by minimizing the required hardware size and power, while providing the ability for a mobile device to detect the human finger position remotely when fingers are hovering above the screen.

In one embodiment of the presented technology, a filter for background noise reduction and multi-touch position detection for contactless 3D touch sensing is provided that categorizes the channel responses into several groups, applies criterion to all of the groups, and filters out any group that does not meet the criterion.

In another embodiment, the technology comprises a low-cost single layer mobile touch-screen, a highly sensitive capacitive sensing circuit, and a corresponding finger 3D position estimation and gesture recognition algorithm compatible with mobile device platforms and that can be programmed into the mobile device's application processor (AP).

One aspect of the technology is a single-layer touch panel for 3D touch sensing that solves the traditional ghost point problems found with self-capacitive, multi-touch sensing and reduces the touch screen manufacturing costs.

Another aspect of the technology is a bootstrapped-oscillator-based correlated double sampling (CDS) capacitive sensing circuit that can eliminate electrode coupling effects and enable accurate finger capacitance detection.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 10 and FIG. 11 illustrate first and second steps, respectively, in an embodiment for selecting valid groups to categorize channel response according to the presented technology.

DETAILED DESCRIPTION

Figure 1:
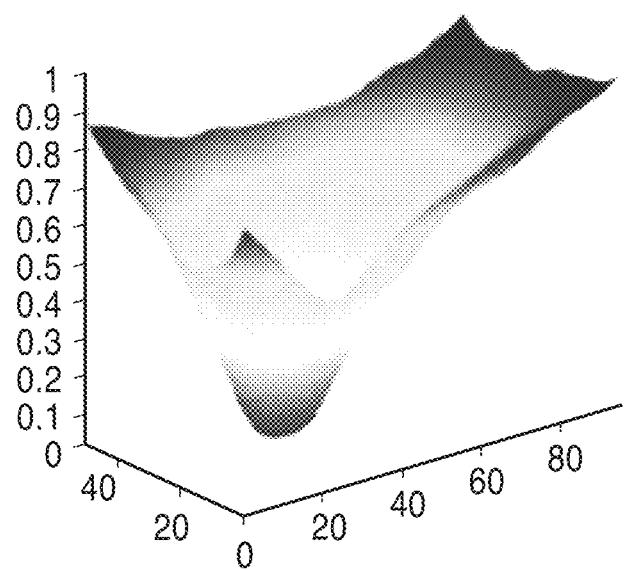
FIG. 1 shows a plot of capacitance over an area of a touch screen used to detect human finger position remotely when fingers are hovering above the screen.

The present technology is directed to 3D touch sensing technology configured for volume and power-constrained mobile devices with low cost, incorporating a single-layer 3D touch sensing system configured to detect the human finger position and gestures remotely when fingers are approaching the screen. As shown in the plot of FIG. 1, capacitive sensing is used to detect the human finger position remotely when fingers are hovering above the screen, i.e. 3D touchless position and gesture detection. The overall system includes a low-cost single layer mobile touch screen, a highly sensitive capacitive sensing circuit, and a corresponding finger 3D position detection algorithm that can be readily programmed into the mobile device's application processor (AP).

1. Touch Panel Hardware

To implement the various aspects of the present technology, a novel single-layer touch screen is disclosed, along with a highly sensitive capacitive sensing circuit specifically adapted for acquiring sensor data for 3D touchless position and gesture detection, as provided in further detail below.

a. Touch Panel Sensor Configuration

Figure 2:
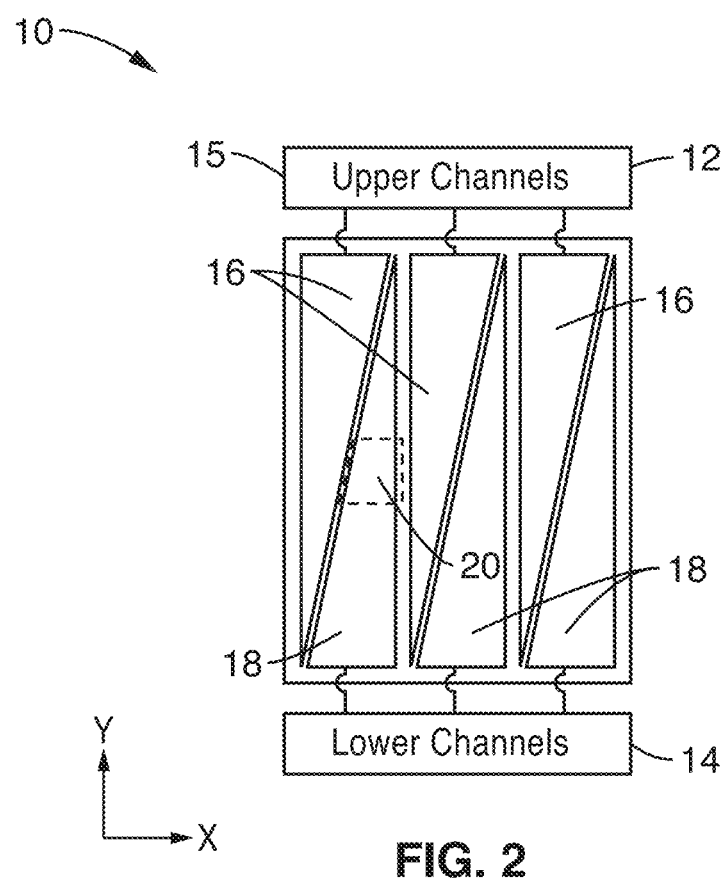
FIG. 2 is schematic diagram of a single-layer touch panel in accordance with the present description.

FIG. 2 shows a schematic diagram of a single-layer touch panel 10 configured for touchless and multi-touch detection through self-capacitance sensing using only one-layer of electrodes. The sensing electrodes comprise opposing upper electrodes 16 and lower electrodes 18 having an elongate triangular shape that are deposited on a surface of screen 15. In a preferred embodiment, screen 15 comprises a display of a mobile device (e.g. cell phone, tablet, etc.) or other portable electronic device (e.g. camera, gaming device, laptop, etc.). However, the technology may also be incorporated in other planar sensing devices, (e.g. mouse touchpads or the like).

Each upper electrode 16 has an independent response within the upper response channels 12 and each lower electrode 18 has an independent response within the lower response channels 14. Each pair of triangular upper 16 and lower 18 electrodes are shaped and positioned to form an elongate rectangular swath along the length of the panel. This configuration provides Y direction detection ability through calculating the upper channels' 12 and lower channels' 14 detected finger capacitance ratio.

Moreover, the structure single-layer touch panel 10 also avoids the generation of diagonal ghost points that limit the traditional self-capacitive touch sensing to multi-touch detection. The triangular-shaped electrodes 16, 18 may create an ambiguity with respect to multiple-finger position if the fingers are exactly aligned together in the same X direction. However, this is a recoverable position error, as opposed to the totally different diagonal ghost points that occur in the normal two-layer touch panel. The configuration of FIG. 2 shows an example of this type of the touch panel 10 with six channels 12, 14, and panel dimensions being 10 cm tall by 6 cm wide. However, it is appreciated that the size of the panel and number of channels may be varied depending on the applications and hardware availability.

Figure 3:
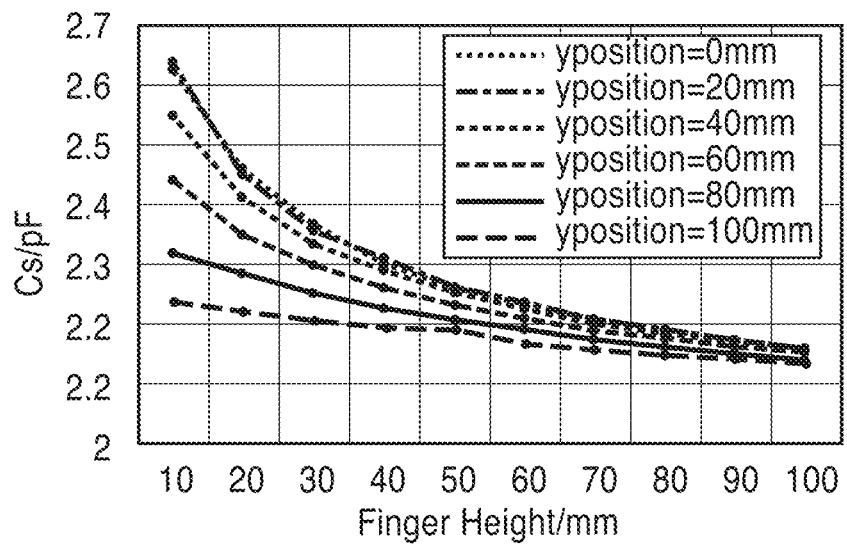
FIG. 3 is a plot of simulation results for finger-induced capacitance response vs. height for the electrode configuration of FIG. 2.

The electrode 16,18 sensitivity to remote finger position was tested to simulate the channel electrode's self-capacitance response versus the height of finger hovering above it. Due to the human body's large form factor, the finger has been modeled as a 10 cm-high-grounded cylinder with radius of 0.5 cm. The measured self-capacitance of the electrode can be regarded as the summation of the electrode's intrinsic capacitance and the finger-induced capacitance. As the simulation results show in FIG. 3, the electrode senses a finger-induced capacitance response of more than 40 fF up to 5 cm finger height, which is large enough for analog circuitry to detect. Moreover, the sweep of the finger in Y direction at the same height shows a comparable difference in the electrode's self-capacitance. This illustrates that it is sufficient for the system to determine the Y position by comparing two nearby electrodes' self-capacitances.

b. Touch Panel Modeling

In additional to the touch panel sensor pattern design, the suitable electrical modeling of the touch panel 10 also plays an important role in defining hardware circuit speculations and evaluating the system performance. The electrodes 16,18 of the touch panel 10 are generally fabricated through depositing a transparent thin film conductor, and in particular, indium tin oxide (ITO), on a screen with a sheet resistance between 10-100 Ohm/square. This large sheet resistance provides a routing resistance that cannot be ignored in the touch panel modeling. Furthermore, each touch panel electrode 16,18 will have a self-capacitance to the ground and mutual capacitance to its nearby electrodes. The self-to-ground capacitance serves as an additional load for the detection circuit so as reduce the system sensitivity and the mutual capacitance creates a shorting path from electrodes to electrodes, limiting the accuracy of finger position estimation.

Figure 4:
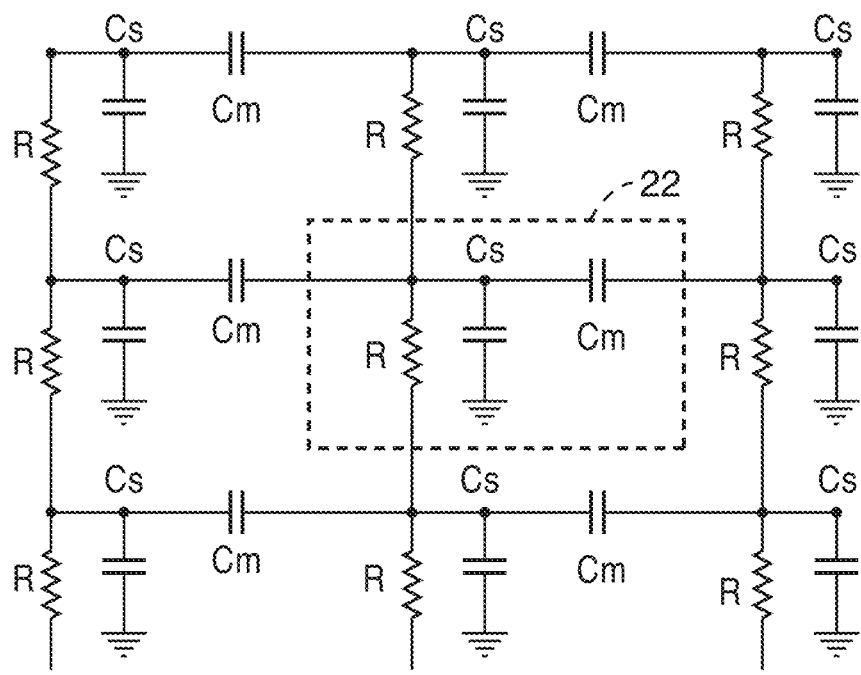
FIG. 4 shows a schematic circuit diagram for a portion of an electrode deposited into discrete lumped RC units on a touch panel.

In order to accurately model each parameter's effect on the system performance, the long electrode 16, 18 is deposited into several portions 20 on screen 15, providing an RC constant of each portion to be much smaller than the sensing signal's periods. FIG. 4 shows a schematic diagram of ITO deposition for a portion 20 of an electrode 16 into three discrete lumped RC units 22. In each unit 22, $C_s$ represents the electrode's self-capacitance of that particular portion, while $C_m$ represents the coupling capacitance to its nearby parallel electrode. $C_s$ and $C_m$ may be obtained through an EM simulation while R can be calculated based on the analytical expression $$R = R_s \times \frac{2L}{3(W_u + W_d)}, \qquad \text{Eq. 1}$$

where the $R_s$ is the sheet resistance of the ITO, L is the length of the electrode in Y direction, and $W_u$, $W_d$ correspond to the upper and lower width of the electrodes 16,18 in the X directions in each portion 20, respectively.

c. Touch Panel Circuitry

Figure 5:
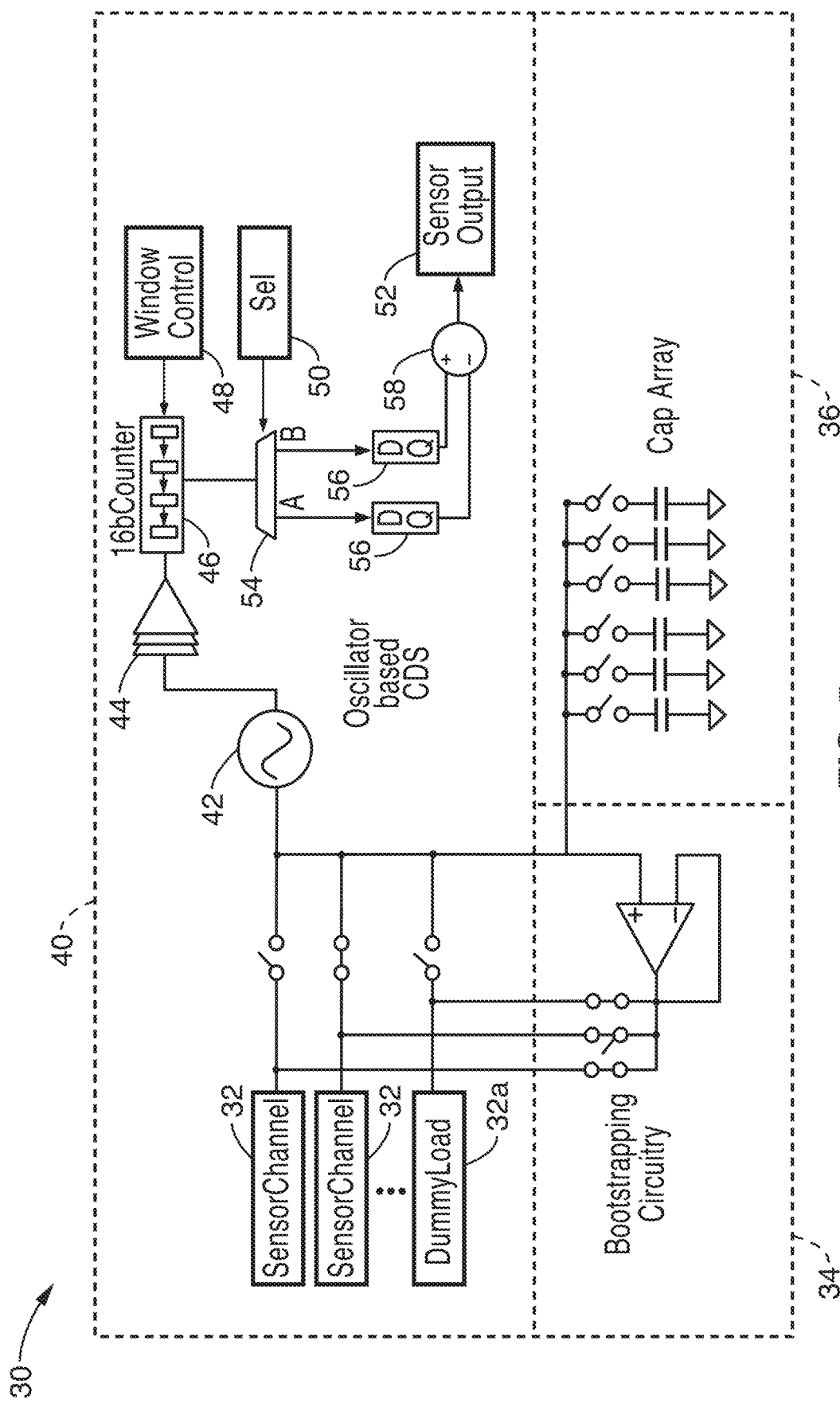
FIG. 5 shows a schematic hardware diagram of the air-touch circuitry of the present technology.
Figure 6:
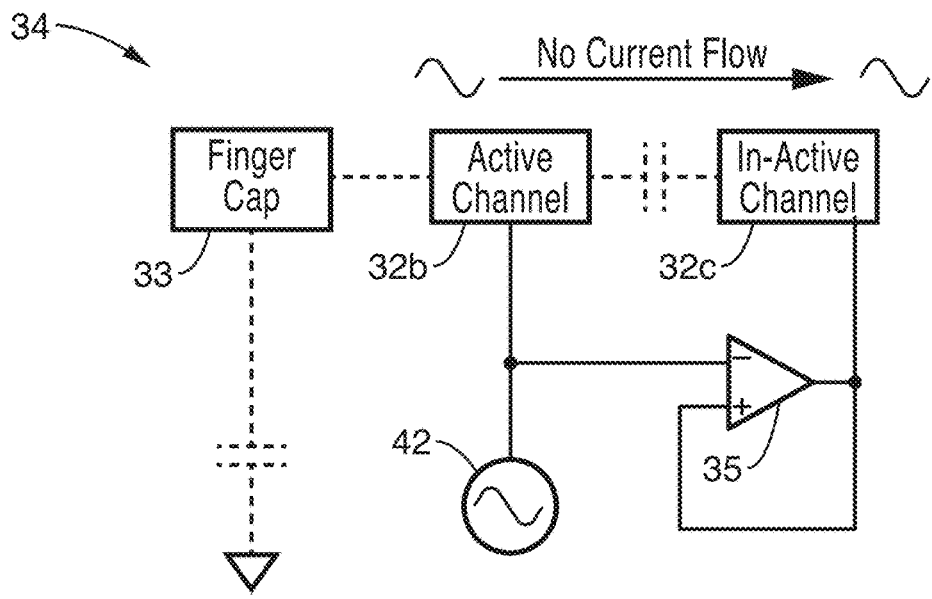
FIG. 6 shows a schematic hardware diagram of bootstrapping circuitry configured to avoid sensitivity degradation and isolate the inter-channel coupling.

FIG. 5 through FIG. 6 detail a hardware sensing circuit configuration for the air-touch system, including correlated double sampling (CDS) technique used to improve system sensitivity and bootstrapping circuitry to reduce inter-channel coupling effects of the touch panel.

FIG. 5 shows a schematic hardware diagram of the air-touch circuitry 30. The system contains an oscillator-based CDS module 40 with trimming capacitor array 36 at the oscillator input to enable high resolution self-capacitive sensing and bootstrapping circuitry 34 to reduce the inter-channel coupling effects.

The major sensing blocks of the BCDS system is an inverter based LC oscillator 42 that is modulated through the loading capacitance with its load capacitor end connected to the touch electrode channels 32. Each channel's load capacitance change is measured through monitoring the frequency change of the oscillator 42. This is achieved through a digital counter 46, and integrating the number of pulses coming from the oscillator 46 in a fixed time window 48. The digital counter 46 tracks the number of periods that the oscillator 42 exhibits in the fixed integration time to estimate the oscillator's frequency.

To remove the common noise effect and improve system sensitivity, each channel 32 is trimmed to one fixed reference load value through capacitor array 36 of individual capacitors 38 during initialization. A correlated double sampling method has been implemented through use of a dummy load 32a (wherein one of the sensor channels is disconnected to the panel and used as the dummy channel) to cancel the channel's intrinsic self-capacitance. In each acquisition, the oscillator 46 is first connected to the desired active input sensor channel for a given integration time and the counter 46 measure's the oscillator's frequency. It then switches (e.g. via a switch or buffer 44) or is connected to a dummy load 32a or channel with similar capacitance for the same integration time to repeat the measurement. The buffer 44 serves as an amplifier to amplify the oscillator 42 output so that the digital counter 46 can read. Sel control 50 configures the mux 54 to output measured frequency data from the counter to the correct register 56, and the difference between these two measured output codes is computed through block 58.

The CDS technique is implemented through outputting the oscillator's frequency difference between the active channel 32 and the dummy channel 32a. Since the dummy channel's load capacitance is equal to the reference load value, any low frequency noise will be suppressed through the subtraction operation, and the finger-induced capacitance becomes directly proportional to the frequency difference between these two measurements. By comparing the counter's 46 output code difference, the finger capacitance value can be derived as Eq. 2:

$$C_{finger} = \Delta C \frac{1}{4\pi^2(f - \Delta f)^2 L} - \frac{1}{4\pi^2 f^2 L} \approx \frac{\Delta f}{42 f^3 L}. \qquad \text{Eq. 2}$$

Since the dummy channel's and active channel's load property is well-matched, the system can cancel most of the low frequency noise (i.e. flick noise, thermal induced frequency drift, etc.) through a zero at the DC in its frequency response. The equivalent transfer function of the CDS can be derived as:

$$Y(t) = \int_{t-t_0}^{t} X(t) - \int_{t}^{t+t_0} X(t) \qquad \text{Eq. 3}$$
$$= \int_{\infty}^{t} 2X(t) - X(t - t_0) - X(t + t_0),$$

$$H(f) = \frac{F(Y(t))}{F(X(t))} = \frac{1}{j2\pi f}(2 - e^{j2\pi t_0 f} - e^{-j2\pi t_0 f}) \qquad \text{Eq. 4}$$
$$= \frac{14\sin(\pi t_0 f)^2}{j2\pi f} = -2j\text{sinc}(\pi t_0 f) t_0 \sin(\pi t_0 f),$$

where $t_0$ is the integration window time. When $f$ is close to DC, the transfer function can be approximated as Eq. 5, showing a zero at the DC:

$$H(f) = -2\pi \sin c(\pi t_0 f) t_0^2 f. \qquad \text{Eq. 5}$$

Although the sensing mechanism is based on self-capacitive sensing, the large inter-channel coupling capacitance can also limit the system sensitivity, causing resolution degradation in the horizontal direction during the channel scanning process. For example, when the finger is hovering over one channel, the small fringe capacitance is directly coupled to the other channels through the inter-channel coupling capacitance, which gives an unwanted response on the other channels. This problem may be mitigated by grounding all unused channels. However, this results in a dramatic increment of the parasitic capacitance so as to degrade the system sensitivity.

To avoid sensitivity degradation and meanwhile isolate the inter-channel coupling, a bootstrapping circuitry 34 is provided as shown in greater detail in the schematic diagram of FIG. 6. The coupling capacitance 33 is nullified through a tracking amplifier 35, which senses the time-domain voltage of the currently active channel 32b and replicates it on the remaining inactive channels 32c. By embedding this tracking amplifier 35, the coupling capacitance received from the input has reduced to 1/A of its original value prior to being output to oscillator 42.

2. Finger Position and Gesture Software

To reconstruct the finger position effectively, the finger position and gesture recognition methods of the present description preferably address several diverse challenges that are generally not critical in 2D touch sensing, such as extracting position information through much smaller detected finger capacitance, large coupling from other channels, and a reduced number of the sensing channels. In addition, the methods are preferably not too complicated in order to implement the methods as application programming or software encoded within the memory and power limitations of the mobile device AP.

Figure 7:
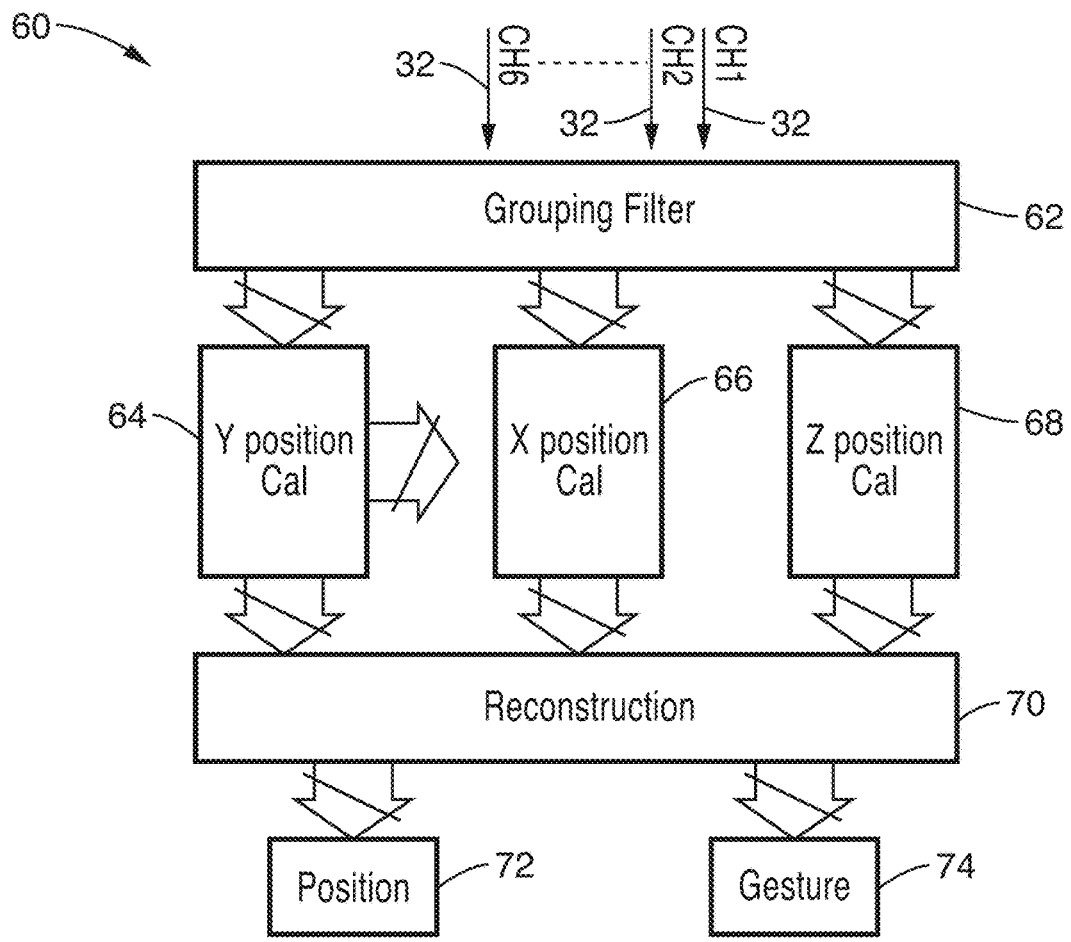
FIG. 7 shows a simplified signal flow diagram for the backend digital processing method of the present description.

To overcome these challenges, a simplified signal flow diagram for the whole backend digital processing method 60 is shown in FIG. 7. Each of the acquired channel's 32 self-capacitance value first goes to a grouping filter 62 where the noise effect (e.g. unwanted coupled finger capacitance) is filtered out. Then, the processed data is used to calculate instant Y direction position 64, X direction position 66, and Z direction position 68 separately. Finally, gestures 74 and finger position 72 in the space are reconstructed at reconstruction block 70 based on the output of the X, Y, Z position with proper smoothing.

a. Grouping Software

The potential unwanted coupling capacitance of the touch panel 10 can cause system degradation, resulting in inaccurate finger position. This unwanted response can be categorized into two main parts: 1) body-introduced background capacitance; and 2) finger capacitance coupled from other channels. For example, when the finger is above a pair of channels (e.g. Channels 1 and 2) a separate (e.g. Channel 6) may see some fringe capacitance $C_{background}$ due to the hand shape and the coupled active $C_{finger}$ through $C_c$. This results in inaccurate position estimation.

Even though the bootstrapping circuitry described above has cancelled much of the coupling capacitance, a small fractional leaked capacitance can still create finger position error. In additional to that, the body-introduced background capacitance is also sensed during the scanning, which creates ambiguity for the system to determine real finger position. To avoid this, a grouping filter as detailed in FIG. 8 to FIG. 12B may be implemented.

Figure 8:
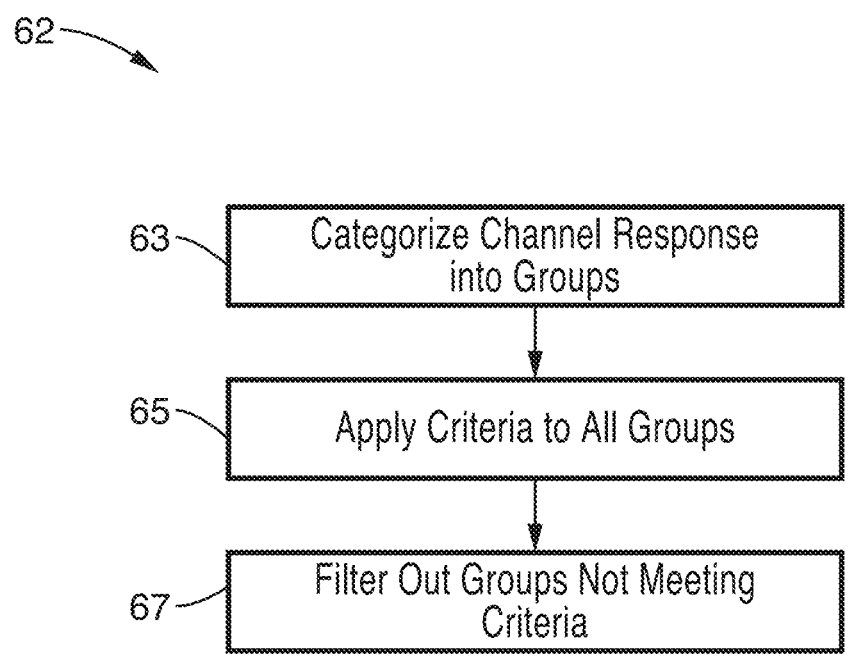
FIG. 8 shows a high-level schematic flow diagram of a grouping filter in accordance with the present description.

FIG. 8 shows a high-level schematic flow diagram of a grouping filter 62 in accordance with the present description. Grouping filter 62 first categorizes the channel responses into several groups at step 63, and then applies one or more criteria to all the groups at step 65. Finally, the groups that do not meet the criterion are filtered out at step 67.

Figure 9:
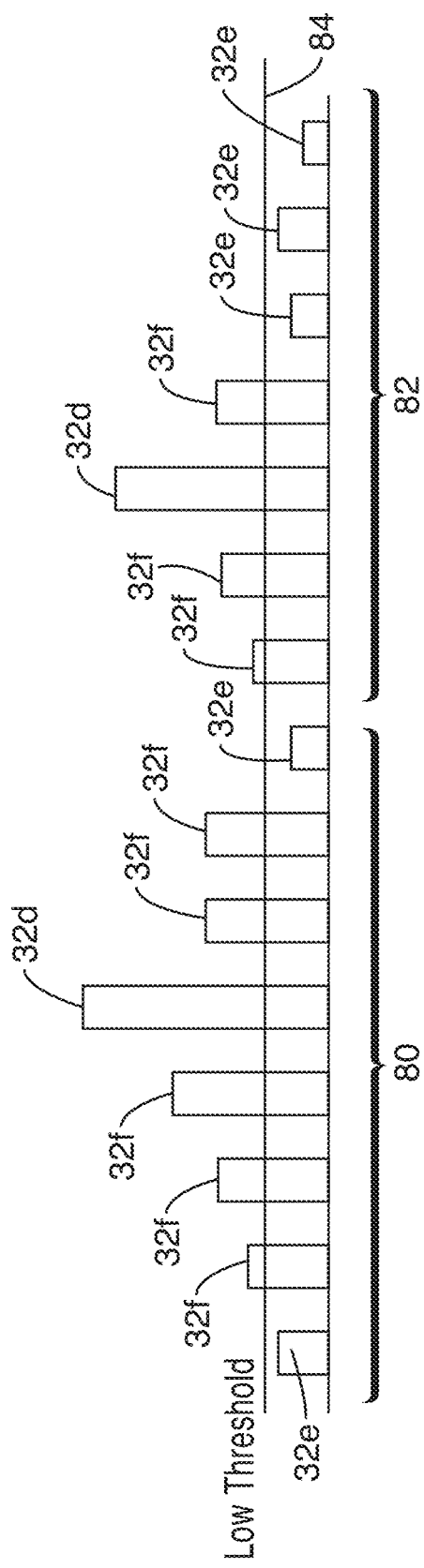
FIG. 9 illustrates an embodiment for categorizing channel response into groups according to the presented technology.

Referring to FIG. 9, categorizing the channel responses into groups (step 63 of FIG. 8) may be performed by identifying one or more peaks in the set of channels 32. In the illustration shown in FIG. 9, two peak channels 32d are identified in the channel responses 32, where the peak channels 32d comprise a center channel response that is more than its left and right channel response 32f. Each peak channel 32d and corresponding left and right channel 32f are thus assigned to groups. In the case shown in FIG. 8, a first group 80 and a second group 82 are established based on the identified channel peaks 32d. To further remove the noise effects, a low-level threshold 84 is applied to filter out weak channel responses 32e from the groups 80, 82.

After categorizing, the channel responses 32 are separated into several groups 80, 82 of responses. Each group 80, 82 will then go through group filter to select the valid groups and filter out the invalid ones. The group filter is configured with two criteria (step 65 in FIG. 8) as illustrated in FIG. 10 and FIG. 11.

FIG. 10 shows a first criterion of the criteria application step 85 shown in FIG. 8. For the first criterion, a valid group must have an average slope that is greater than a predetermined slope threshold 88. The average slope threshold 88 is determined by passing through the top of the channel peak 32d to the tops of subsequent left or right channel responses 88. In the illustration of FIG. 10, the left most channel peak 32d meets the average slope threshold criterion, and thus are categorized as a valid group. Correspondingly, middle and right channel peaks 32d do not meet the average slope threshold criterion, and are thus categorized as an invalid group.

FIG. 11 shows a second criterion of the criteria application step 85 shown in FIG. 8. For the second criterion, a valid group must have at least one channel's response more than a predetermined channel peak threshold 86. In the illustration of FIG. 11, both groups meet the second criterion, and are thus categorized as valid groups.

In this manner, the presented technology solves problems with fake channel response (due to body-induced background capacitance) in a touch screen sensing system. While a fake channel response may be acceptable with low-resolution conventional touch screens, there is a trend toward touch sensing to three dimensions in which the touch screen can detect the finger position remotely. This three-dimensional sensing often requires a much higher sensing resolution regarding finger capacitance and fake channel responses need to be filtered out.

Accordingly, in the example shown in FIGS. 10 and 11, there are 15 channels 32 from left to right, and each channel has one response. The total 15 channels' responses are grouped into two groups, first group 80 and second group 82, but there could be a fewer or greater number of groups depending on the channel responses. The filter 62 finds the peak 32d first (center response is larger than left and right), and each peak can be regarded as a group. Then, from the left to right peak or from highest to lowest peak, corresponding channels are added to each of the groups. If the next left channel response (outside the current group and it is not grouped) is less than or equal to the current most left channel's response in the group and the response is more than the low-level threshold 84, then it is added to the group. This is also done for the channels on the right side. The low-level signals 32e that are filtered out will not be added to the groups. However, during calculation of the average slopes for each group, the filtered-out signals 32e may be used in order to calculate the difference between the filter-out channels to the most left/right channels in the group.

The group filtering method 62 illustrated in FIG. 10 and FIG. 11 may be implemented as a routine or algorithm incorporating the following steps:

1) acquire a signal from each of the output channels;
2) compare signal level for each channel to a low-level threshold and filtering out any signal having a level below the low-level threshold, wherein a filtered set of signals remains;
3) identify a peak signal (n) in the filtered set of signals, wherein a peak signal comprises a signal that both preceded by (n−x) and followed by (n+x) a signal having a lower level, where x is an integer 1, 2, 3, . . . ;
4) assign the peak signal (n) and said preceding (n−x) and following (n+x) signals to a group;
5) increment x;

6) if the signal level for a preceding or following signal is less than or equal to the previous signal level, add that signal to the group;

7) repeat steps 5 and 6 until the group is complete;

8) fit the filtered out signals and the signals in the group to a curve and measure slope of the fitted curve;

9) designate the group as valid if at least one channel response in the group meets or exceeds a peak response threshold and the channel responses in the group has an average slope that meets or exceeds a defined slope threshold; and 10) output the valid signal groups as a filtered subset of the signals from the output channel.

Figure 12A:
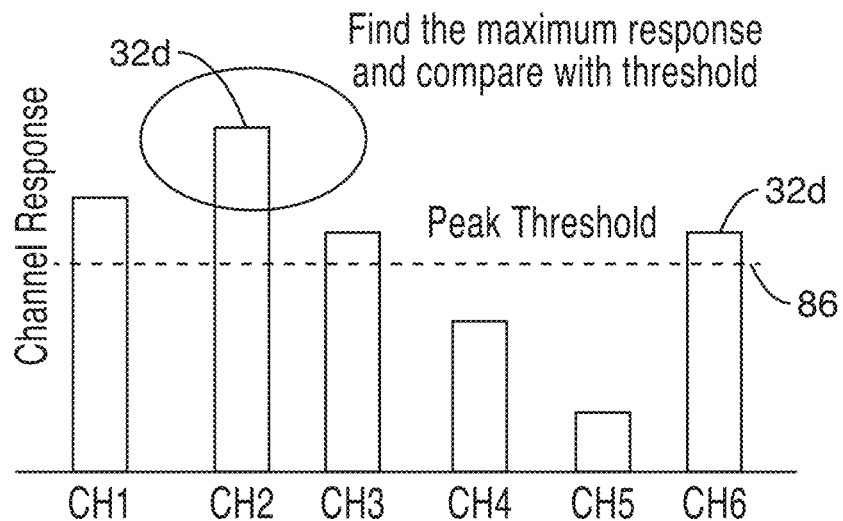
FIG. 12A through FIG. 12B illustrate a simplified embodiment of the grouping filter for one-touch application in accordance with the present description.
Figure 12B:
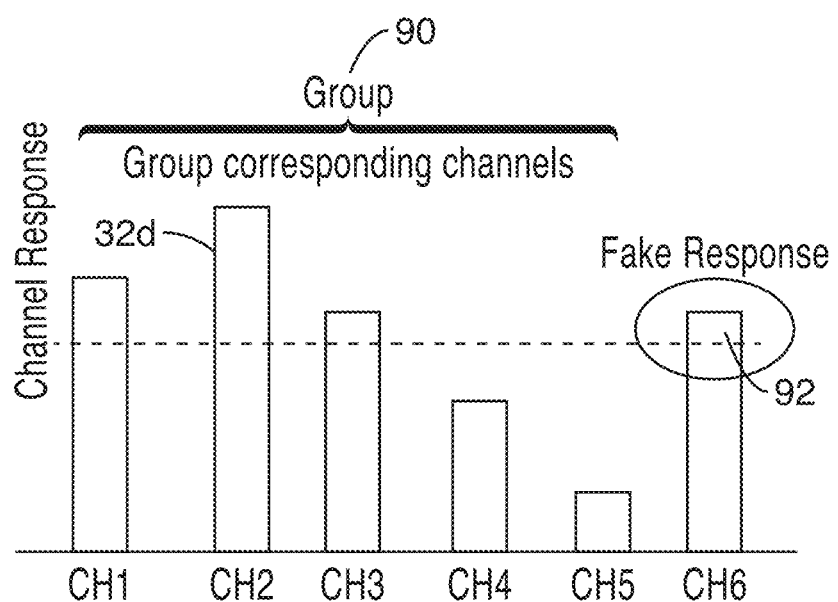

FIG. 12A through FIG. 12B illustrate a simplified embodiment of the grouping filter 62. While the filter shown in FIG. 10 and FIG. 11 is preferred because it supports both single and multi-touch operations, the simplified embodiment shown in FIG. 12A through FIG. 12B may be alternatively used for single-touch implementations.

In single-touch operations, when a touch occurs, there will be a peak response group in the corresponding nearby channels. In this embodiment, a group is defined as the peak envelope in the channel response (center-channel response is more than its left and right response). For single-touch application, the valid group number should only be one. All other groups which may have small peaks should be regarded as fake groups since it violates the single-touch principle. Accordingly, the following steps can be used to find the useful groups for calculating finger position.

Step 1: Find the maximum response 32d among all channels and compare with the threshold 86 to validate if there is a touch action or not (FIG. 11A).

Step 2: Group the corresponding nearby channels as the valid group 90 response and use them for signal processing, other peaks identified are classified as a fake response 92.

After the grouping filter, the output data will be passed to each of the X, Y, Z position calibration blocks 64, 66 and 68 to separately to calculate the instant position in different directions (see FIG. 7).

b. Instant Y Position Calculation

The horizontal direction instant position is separated into X, Y directions, the system first uses the grouped data to determine the instant Y position and then estimate the instant X position information through the obtained instant Y position information.

The instant Y position information (block 64 in FIG. 7) may be obtained through comparing the upper 12 and lower 14 channels' response difference. This takes into consideration that for a particular Y position, the responses for the upper 12 and lower 14 channels will be different. For example, when a finger is close to the touch panel's 10 upper edge, upper channels 12 will have a much large response compared to the lower channels 14 due to its large sensing area compared with its nearby lower channel's. This is illustrated in the schematic diagram of the touch panel 10 shown in FIG. 13. As the location of the finger moves upward from the middle of the panel (0 position line), the length of the horizontal line 93 crossing upper electrode 16 becomes larger and that for lower electrode 18 becomes smaller, such that the potential response is largest for upper electrode 16 and smallest (merely a point on the triangle) for lower electrode 18 at the top of the screen ($Y_{max}$). The inverse is true when the finger position or line 92 moves from the 0 Y position downward toward the bottom of the screen ($-Y_{max}$).

Figure 13:
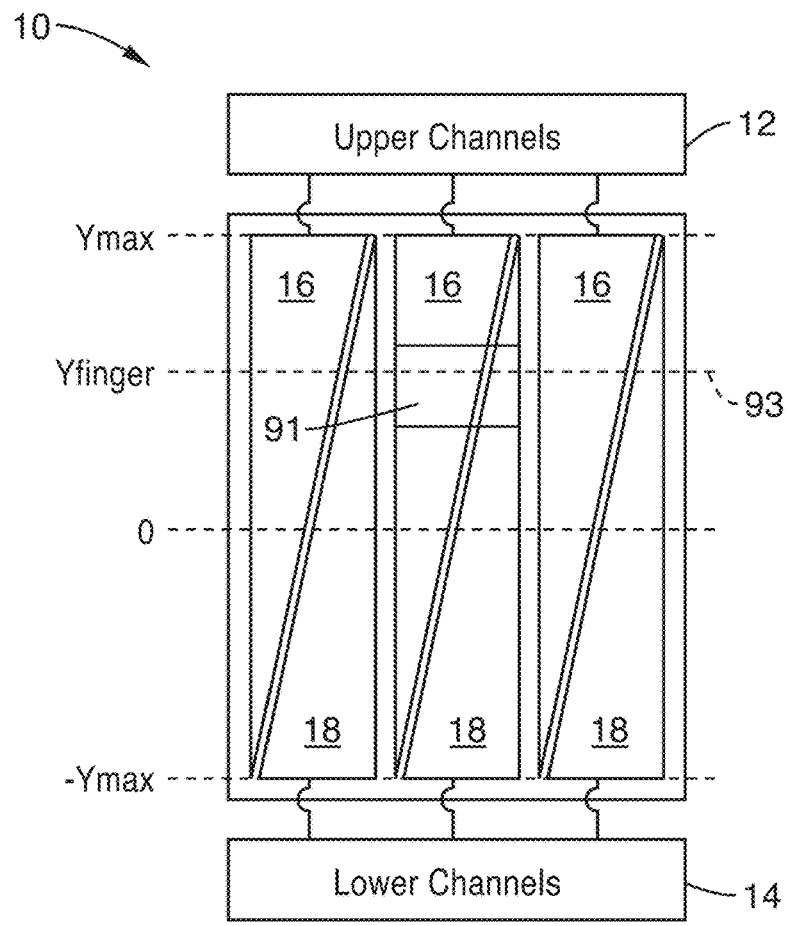
FIG. 13 shows a schematic diagram of the touch panel for Y-position calculation.
Figure 14:
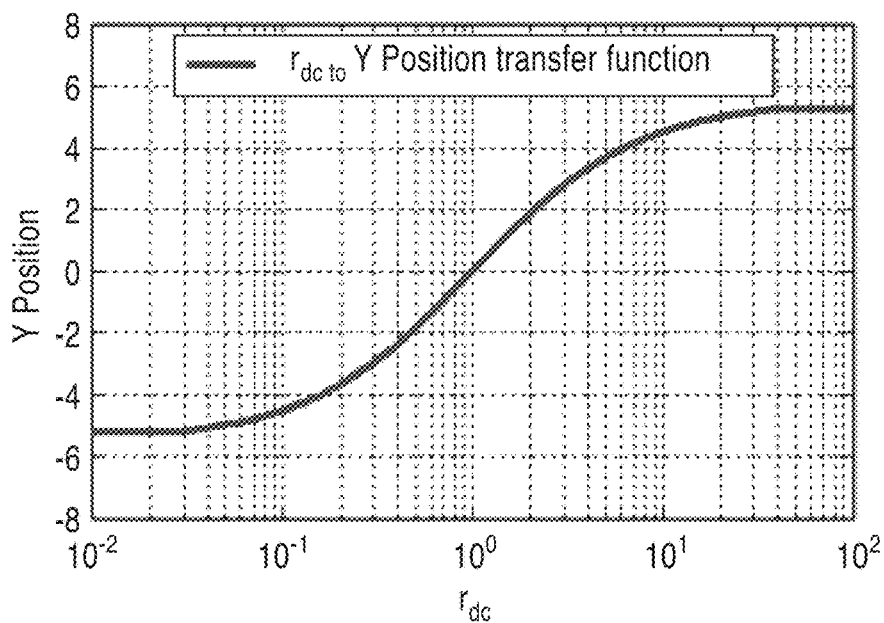
FIG. 14 shows a plot of the $r_{dc}$ to Y position transfer function for calculating Y position for the exemplary area shown in FIG. 13.

By assuming the finger induced capacitance value is proportional to its shielded area, we can derive the Y position based on the channel-upper-to-lower ratio ($r_{dc}$) according to Eq. 6 and Eq. 7:

$$r_{dc} = \frac{\Sigma \Delta C_{upper}}{\Sigma \Delta C_{lower}}, \qquad \text{Eq. 6}$$

$$Y_{finger} = \frac{r_{dc} - 1}{r_{dc} + 1} Y_{max}, \qquad \text{Eq. 7}$$

where $\Delta C_{upper}$ and $\Delta C_{lower}$ correspond to each upper 16 and lower 18 triangular electrode's sensed finger capacitance as shown in FIG. 13. FIG. 14 shows a plot of the $r_{dc}$ to Y position transfer function for calculating Y position for the exemplary area 91 shown in FIG. 12.

To further remove the noise effects when one upper or lower channel's response is very small, a certain threshold may be added for the $r_{dc}$ value. When $r_{dc}$ exceeds the threshold, the response is set to a fixed value. The modified instant Y position equation is described in Eq. 8.

$$Y_{finnger} \begin{cases} \frac{r_{dc}-1}{r_{dc}+1} Y_{max} & 0.025 \le r_{dc} \le 40 \\ 0.95 Y_{max} & r_{dc} > 40 \\ -0.95 Y_{max} & r_{dc} < 0.025 \end{cases} \qquad \text{Eq. 8}$$

c. Instant X Position Calculation

The instant X position (block 66 of FIG. 7) is calculated based on a center-weighted algorithm. Taking into account that the electrodes 16, 18 have different widths in different Y positions, accurately representing the electrode's center position in the X direction plays an important role to determine the actual finger instant position. Here we use the obtained Y position information (block 66 of FIG. 7) to define each electrode's X direction center position and calculate the finger position based on the weighted average of all the electrodes' center X positions. Referring FIG. 15, the center X position is a line (96a for lower electrode 18 and 96b for upper electrode 16) splitting the electrode along its length. The center X position for the boxed area 94 in FIG. 15 corresponds to the intersections of lines 96a and 96b with Y finger position line 93. The method can be separated into the follow two steps in accordance with Eq. 9 and Eq. 10:

Step 1: Find each electrode's center X position based on the finger's Y position obtained above, according to $$X_{center\_i} = \frac{X_{top\_i} + X_{bot\_i}}{2} + \frac{X_{top\_i} - X_{bot\_i}}{2} \times \frac{Y_{finger}}{Y_{max}}. \qquad \text{Eq. 9}$$

Figure 15:
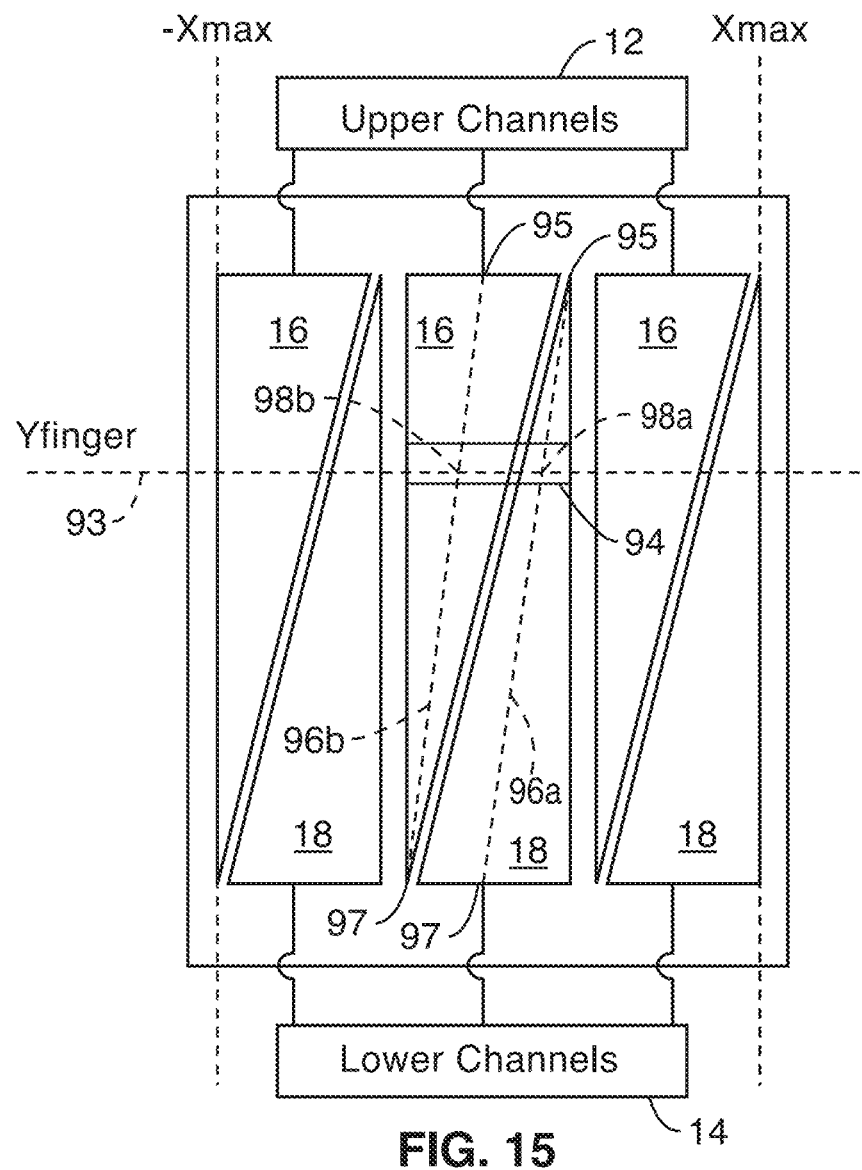
FIG. 15 shows a schematic diagram of the touch panel for X-position calculation.

Step 2: Calculate the weighted average of all the channels' center X position with their finger capacitive responses and output the average as the final X position according to $$X_{finger} = \frac{\sum_i X_{center\_i} \times \Delta C_i}{2 \sum_i \Delta C_i}, \qquad \text{Eq. 10}$$

where $X_{center\_i}$ is the i channel's center X position at the certain Y finger value and the $X_{top\_i}$ corresponds to the i channel's top-edge's middle point X position (points 95 in FIG. 15); $X_{bot\_i}$ represents the i channel's bottom-edge's middle point X position (points 97 in FIG. 15), and $\Delta C_i$ is the sensed i channel's finger capacitance.

d. Instant Z Position Calculation

The instant Z position calculation is based on the total measured finger-induced coupling capacitance on the touch panel 10. As the size of touch panel is much larger than the user's finger, the finger is modeled as a small circular disk on top of the plane. In this case, the coupling capacitance is a combination of the parallel coupling capacitance and fringing capacitance. Here the parallel coupling capacitance is inversely proportional to the finger height, while the fringing capacitance has a non-linear transfer function to finger height.

To obtain an accurate relationship between the capacitance and finger distance, we have used the $2_{nd}$ order polynomial curve to fit the EM simulation results on the finger height versus channel's sensed finger capacitance. The $2_{nd}$ order polynomial equation can be written as:

$$Z_{finger} = \frac{\epsilon_0 A}{a \sum_i \Delta C_i} + \beta \left( \frac{\epsilon_0 A}{a \sum_i \Delta C_i} \right)^2, \qquad \text{Eq. 11}$$

where $\alpha$, $\beta$ are constant coefficients obtained through curve fitting on the EM modeling result, A represents the finger surface area and $\Delta C_i$ corresponds to the i channel's sensed finger capacitance. After Z position calculation is done, the X, Y, Z position is passed through a five-tap low pass IIR filter at reconstruction block 70 (FIG. 7) to further smooth the position.

e. Position Reconstruction and Gesture Recognition

The final reconstructed finger position is based on the instant finger position information obtained from above. Since the finger is remote to the screen, any environmental or systemic noise can result a large variation on the calculated finger position, making the output finger position unstable. In addition, the environment can also generate some random peak noise due to the electromagnetic interference or background change, causing a large finger position jump from sample to sample.

To avoid this, a $5^{th}$ order IIR filter has been implemented on the reconstruction block 70 (FIG. 7) to remove random peak noise effect as well as stabilizing the reconstruct finger position. Through using this IIR filter, high frequency noise is removed and output position change is much smoother.

In additional to the position detection 72, gesture recognition 74 can also be obtained through the sensed finger position. The difference between the position and gesture recognition is that for gesture recognition, it aims at to detect the trends of the finger movement instead of real finger position and target to provide a large sensing range than the position detection.

Figure 16:
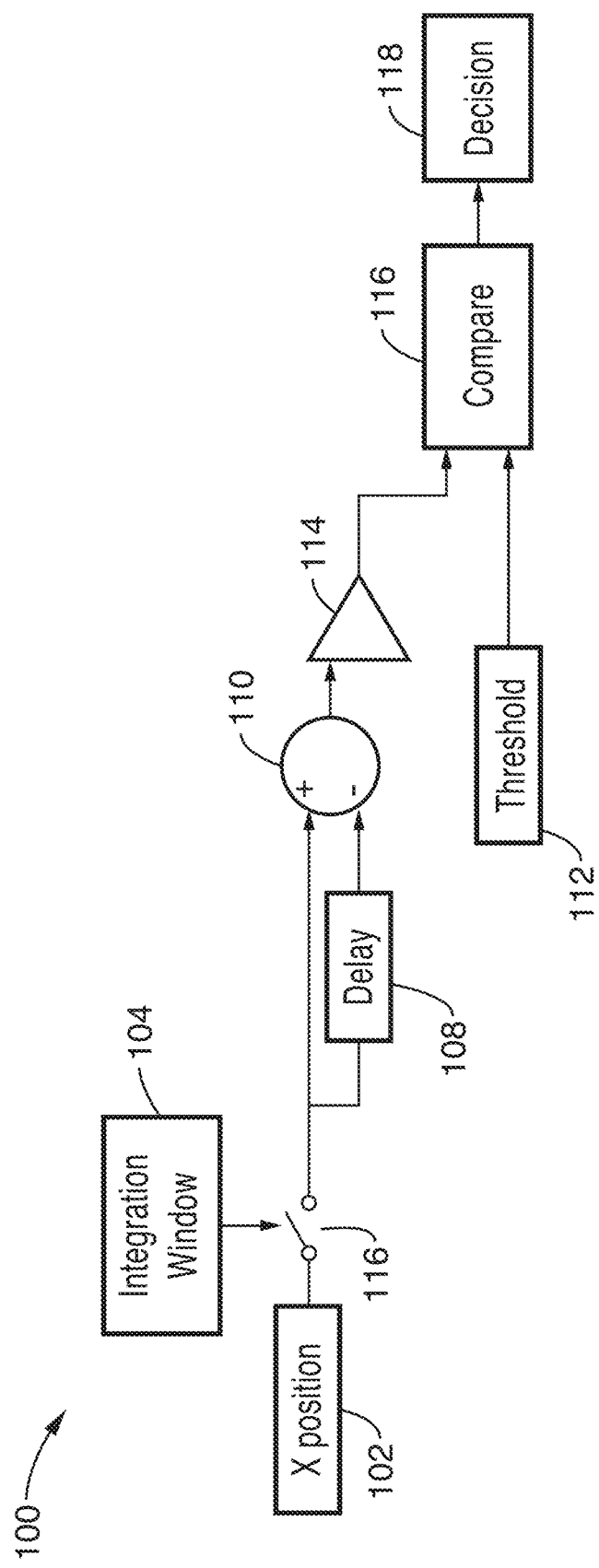
FIG. 16 shows an exemplary flow diagram for a gesture recognition method in accordance with the present description.

FIG. 16 shows an exemplary flow diagram for gesture recognition method 100 in the X direction. Derivations of the obtained instant finger position 72 (FIG. 7) are acquired in three different directions (X position data 102 for FIG. 16) and passed to an integrator 114. The derivation of the position is achieved through a delay block 108, which outputs the input data with a specified delay and a minus function 110 to compare its two inputs. An integration window 104 is applied at switch 106. The integration window 104 controls the maximum integration time and measures the time it takes to detect a gesture. The integration value is compared with a threshold value 112 at block 116 to determine if any direction's movement exists or not.

Gesture recognition output is provided at decision block 118. The integrator 114 provides a benefit in the reduction of the high frequency noise effect so as to improve the system sensitivity and extend the sensing range in gesture recognition's mode. In addition, the speed of the moving hands can also be obtained through monitoring the time for the integrator's output to pass the thresholds. Similar methods to that provided in FIG. 16 are used for gesture recognition in the Y and Z directions.

3. System Configuration

Figure 17:
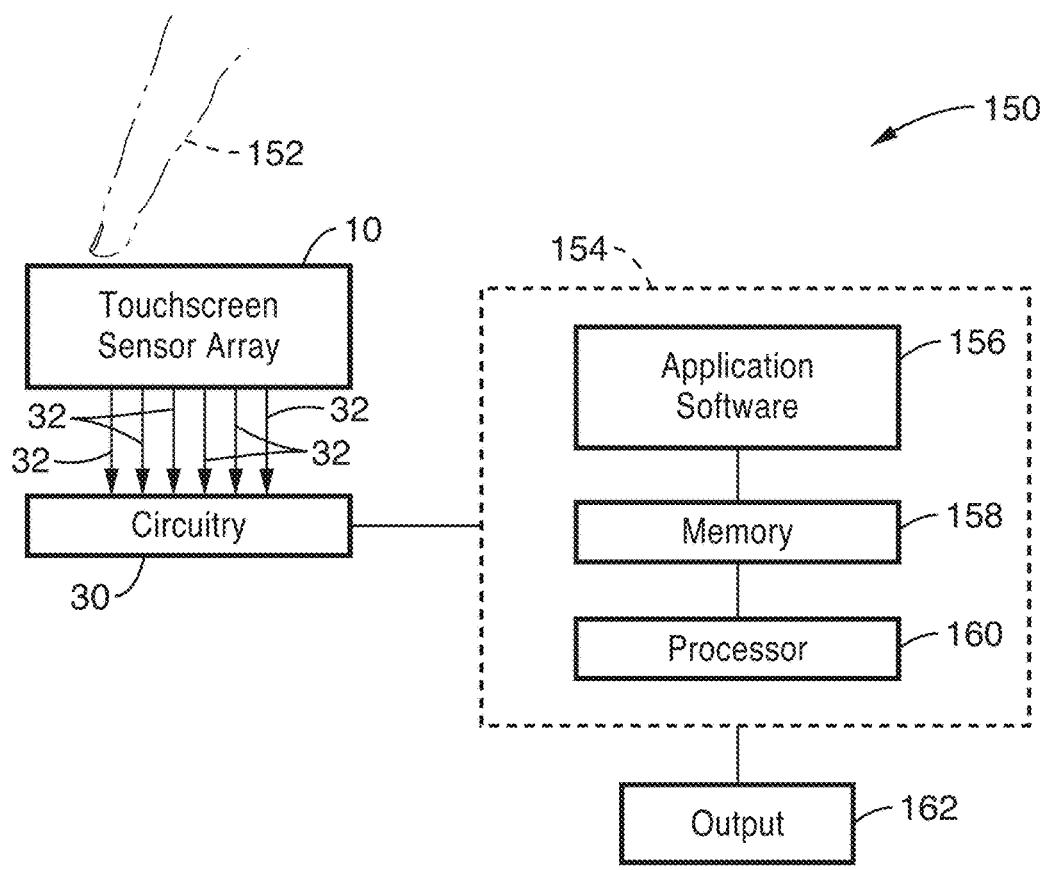
FIG. 17 illustrates a schematic diagram of a comprehensive 3D touch sensing system in accordance with the present technology.

FIG. 17 illustrates a schematic diagram of a comprehensive 3D touch sensing system 150 in accordance with the present technology. The electrode sensors 16/18 of touch pad 10 acquire signals via capacitive sensing of finger 152 that is hovering over or touching touch pad 10. Each electrode has a corresponding response channel 32, the output of which is further processed by circuitry 30. Circuitry 30 comprises hardware for implementing a correlated double sampling (CDS) technique used to improve system sensitivity and bootstrapping circuitry to reduce inter-channel coupling effects of the touch panel 10. A computing unit 154 (which may be n on-board processing component of a mobile device) received the signal from circuitry 30, and applies application software 156 to further process the data from response channels 32. Application software 156 may be stored in on-board memory 158 of the device, and include instructions for executing any one of methods 60, 62 (FIG. 7, FIG. 8) and/or gesture recognition method 100 (FIG. 16) on processor 160 (e.g. the application processor (AP) of the mobile device) to output 3D touchless position and gesture detection data 162.

4. Experiment and Discussion

A prototype of the aforementioned air-touch 3D touch sensing system was build and tested. The first experiment was performed to check the CDS technique (see CDS module 40 of circuitry 30 shown in FIG. 5) with respect to improving the system sensitivity. Also, a comparison of the channel response to different finger position was performed to show the reduction of the inter-channel coupling effect through bootstrapping technique (see bootstrapping module 34 (FIG. 5 and FIG. 6). Finally, a whole air-touch 3D sensing system was built and characterized with instant demonstrations of the system's concept.

a. Hardware Circuit Measurement

One of the techniques implemented to improve the hardware sensing resolution was through applying CDS method to reduce the noise in the system. To verify the effectiveness of this method, we connected a prototyped sensor with a standard HTC 3.4" mobile touch screen array (Channel Number: X=16 Y=10).

Figure 18:
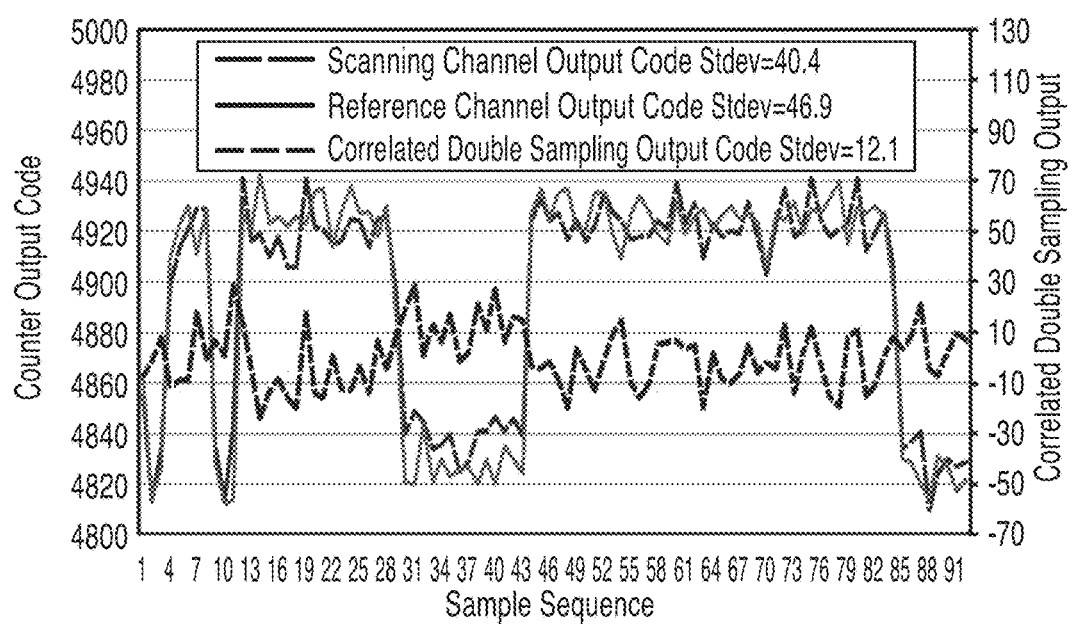
FIG. 18 is a plot of the test results showing counter output code for the regular channels as well as the CDS output.

During the measurement, we first recorded the sensor's counter's output when the sensor is connected to the reference channel (dummy load) and then repeat the measurement with the sensor connected to the active channel. Next, we plotted these two cases' values and compute each case's standard deviation. Then, we performed the subtraction operation to produce the CDS output. FIG. 18 shows the counter output code for the regular channels as well as the CDS output. Based on the curve of the active channel's output and reference channel's output, we see high levels of correlation between the two. By comparing the standard deviation of the regular channel output and the CDS output, we see 10.5 dB reduction of system noise through CDS function.

Besides the CDS, the bootstrapping circuitry 34 was also implemented to reduce the inter-channel coupling effect so as to improve the hardware circuit resolution for finger position estimation in X,Y direction. To verify this, the sensed channel was fixed to a vertical channel located in the center of a screen as highlighted. The finger was moved from the left side of the screen to the right side with different heights, and the channel measured. It was found that when the finger's height was below 3 cm, the bootstrapping circuitry provides sufficient coupling isolation.

b. Air-touch Top System Performance Evaluation

The demonstration of the air-touch 3D Touch Sensing Concept was done through a prototype setup. The prototype system used a mobile-phone sized touch screen with a triangular electrode pattern as detailed before, a low power capacitive sensing circuit to sense the finger capacitance, an ARM-based microprocessor unit (MCU) and a laptop to calculate and display the reconstructed finger position.

The system was real-time updated with a sampling speed up to 30 times per second and a power consumption of 2.3 mW for the hardware sensing circuit. The experiment was conducted with user's finger hovering on top of the screen and moving both horizontally and vertically.

The experiment showed that the system achieves an X, Y direction resolution up to 1 cm (measured at a finger height at 1 cm) and Z direction detection range up to 6 cm with a resolution of 2 cm. The degradation of the Z direction resolution occurs with finger heights more than 3 cm due to the finger modeling inaccuracy. However, at this range, the interface will only require detection of movement gestures instead of pure accurate height.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multi-core devices, and variations thereof.

From the description herein, it will be appreciated that that the present disclosure encompasses multiple embodiments which include, but are not limited to, the following:

1. A touch panel configured for touchless or multi-touch detection, comprising: an array of triangular shaped sensing electrodes disposed along a surface of the touch panel; the array of sensing electrodes comprising a plurality of upper electrodes and matching number of lower electrodes; wherein each upper electrode has an upper end disposed at or near an upper edge of the panel and a lower end disposed at or near a lower edge of the panel, and wherein the upper end has a width that decreases downward along the length of the upper electrode to form a point at the lower end; wherein each upper lower electrode has an upper end disposed at or near an upper edge of the panel and a lower end disposed at or near a lower edge of the panel, and wherein the lower end has a width that decreases upward along the length of the lower electrode to form a point at the upper end; wherein an output of each upper electrode is coupled to a dedicated upper response channel; wherein an output of each lower electrode is coupled to a dedicated lower response channel; and wherein a presence of a finger at or near the surface of the touch panel may be detected and located as a function of calculating a capacitance ratio of the upper channels and lower channels.

2. The touch panel of any preceding embodiment: wherein each upper electrode and adjacent lower electrode form an electrode pair; and wherein each electrode pair is shaped and positioned to form an elongate rectangular swath substantially along a length between the upper edge and lower edge of the panel.

3. The touch panel of any preceding embodiment, wherein the electrodes are disposed within a single-layer on the touch panel.

4. The touch panel of any preceding embodiment, wherein the electrodes are configured to detect a location of the finger in three dimensions with respect to the surface of the touch panel via self-capacitive sensing of the finger.

5. The touch panel of any preceding embodiment, further comprising: an oscillator-based correlated double sampling (CDS) module coupled to the upper and lower channels; and wherein the oscillator-based CDS module is configured to configured to remove noise and enhance sensitivity of the electrode array.

6. The touch panel of any preceding embodiment, wherein the oscillator-based CDS module comprises trimming capacitive array.

7. The touch panel of any preceding embodiment: wherein the touch panel comprises a display screen; and wherein the electrode array is deposited on the panel as a transparent thin-film conductor.

8. The touch panel of any preceding embodiment, wherein the electrodes are deposited as a plurality of discrete lumped RC circuits.

9. The touch panel of any preceding embodiment, further comprising: a bootstrapping circuit coupled to the upper and lower channels; the bootstrapping circuit comprising a tracking amplifier configured to isolate and remove inter-channel coupling capacitance between the sensing electrodes.

10. The touch panel of any preceding embodiment, further comprising: a grouping filter configured to categorize responses from the upper and lower channels and remove responses not meeting one or more criteria applied to the responses.

11. An apparatus for finger position detection, the apparatus comprising: (a) a touch panel having a plurality of capacitive sensing electrodes configured to output signals on a plurality of output channels, wherein an output signal level on an output channel is associated with a channel response for that channel; and (b) a digital filter coupled to the output channels, the digital filter configured to transform signals received from the output channels into a filtered subset by performing steps comprising: (i) categorizing the channel responses into one or more groups; (ii) applying one or more criteria to the one or more groups; and (iii) filtering out any groups that do not meet the one or more criteria.

12. The apparatus of any preceding embodiment, wherein categorizing the channel responses into one or more groups comprises: acquiring a signal from each of the output channels; comparing signal level for each channel to a low-level threshold and filtering out any signal having a level below the low-level threshold such that a filtered set of signals remains; identifying a peak signal in the filtered set of signals, wherein a peak signal comprises a signal that is both preceded and followed by a signal having a lower level; and assigning the peak signal and neighboring signals to a group.

13. The apparatus of any preceding embodiment, wherein assigning the peak signal and neighboring signals to a group comprises: assigning the peak signal and said preceding signal and following signal to a group; and assigning any additional preceding signals or following signals to the group if said additional preceding signals or following signals have a level lower than or equal to the level of an immediately adjacent signal.

14. The apparatus of any preceding embodiment, wherein applying one or more criteria to the one or more groups comprises: fitting the filtered out signals and the signals in the group to a curve and measuring slope of the fitted curve; and designating the group as valid if at least one channel response in the group meets or exceeds a peak response threshold and the channel responses in the group has an average slope that meets or exceeds a defined slope threshold.

15. The apparatus of any preceding embodiment, wherein filtering out any groups that do not meet the one or more criteria comprises outputting any valid signal groups as a filtered subset of the signals from the output channel.

16. The apparatus of any preceding embodiment, wherein said digital filter comprises a computer processor and memory storing instructions executable by the computer processor circuit to perform steps (i) through (iii).

17. The apparatus of any preceding embodiment, further comprising: (c) at least one instant position calculation module for calculating a position of a finger touching or above the touch panel.

18. The apparatus of any preceding embodiment, wherein the plurality of capacitive sensing electrodes comprises pairs of adjacent upper sensing electrodes and lower sensing electrodes; and wherein the at least one instant position calculation module is configured to calculate the position of the finger by performing steps comprising: calculating an instant Y position by comparing channel responses of upper sensing electrodes and channel responses of lower sensing electrodes; and calculating an instant X position by using the calculated instant Y position to define an X direction center position of each sensing electrode and calculate the instant X position based on a weighted average of all the X direction center positions.

19. The apparatus of any preceding embodiment, wherein the instant position calculation module is further configured to calculate the Z position of the finger by performing steps comprising: measuring a total finger-induced capacitance of the touch panel.

20. The apparatus of any preceding embodiment, further comprising: (d) a gesture recognition model configured to receive measured finger position data and generate a trend of a finger movement.

21. The apparatus of any preceding embodiment, wherein the gesture recognition module is configured to generate a trend of the finger movement by performing steps comprising: obtaining derivations of the obtained instant finger position in X, Y and Z directions; applying an integration window to the obtained derivations to generate an integration value; comparing the integration value to a threshold value to determine if a direction's movement exists; and generating gesture recognition output.

22. An apparatus for finger position detection, the apparatus comprising: (a) a touch panel having a plurality of capacitive sensing electrodes configured to output signals on a plurality of output channels, wherein an output signal level on an output channel is associated with a channel response for that channel; and (b) a processor coupled to the output channels, (c) a non-transitory memory storing instructions executable by the processor; (d) wherein said instructions, when executed by the processor, are configured to transform signals received from the output channels into a filtered subset by performing steps comprising: (i) categorizing the channel responses into one or more groups; (ii) applying one or more criteria to the one or more groups; and (iii) filtering out any groups that do not meet the one or more criteria.

23. The apparatus of any preceding embodiment, wherein categorizing the channel responses into one or more groups comprises: acquiring a signal from each of the output channels; comparing signal level for each channel to a low-level threshold and filtering out any signal having a level below the low-level threshold such that a filtered set of signals remains; identifying a peak signal in the filtered set of signals, wherein a peak signal comprises a signal that is both preceded and followed by a signal having a lower level; and assigning the peak signal and neighboring signals to a group.

24. The apparatus of any preceding embodiment, wherein categorizing the channel responses into one or more groups comprises: acquiring a signal from each of the output channels; comparing signal level for each channel to a low-level threshold and filtering out any signal having a level below the low-level threshold such that a filtered set of signals remains; identifying a peak signal in the filtered set of signals, wherein a peak signal comprises a signal that is both preceded and followed by a signal having a lower level; and assigning the peak signal and neighboring signals to a group.

25. The apparatus of any preceding embodiment, wherein assigning the peak signal and neighboring signals to a group comprises: assigning the peak signal and said preceding signal and following signal to a group; and assigning any additional preceding signals or following signals to the group if said additional preceding signals or following signals have a level lower than or equal to the level of an immediately adjacent signal.

26. The apparatus of any preceding embodiment, wherein applying one or more criteria to the one or more groups comprises: fitting the filtered out signals and the signals in the group to a curve and measuring slope of the fitted curve; and designating the group as valid if at least one channel response in the group meets or exceeds a peak response threshold and the channel responses in the group has an average slope that meets or exceeds a defined slope threshold.

27. The apparatus of any preceding embodiment, wherein filtering out any groups that do not meet the one or more criteria comprises outputting any valid signal groups as a filtered subset of the signals from the output channel.

28. The apparatus of any preceding embodiment, wherein said instructions when executed by the processor further perform steps comprising: (iv) calculating a position of a finger touching or above the touch panel.

29. The apparatus of any preceding embodiment, wherein the plurality of capacitive sensing electrodes comprises pairs of adjacent upper sensing electrodes and lower sensing electrodes; and wherein said instructions when executed by the processor further perform steps comprising: calculating an instant Y position by comparing channel responses of upper sensing electrodes and channel responses of lower sensing electrodes; and calculating an instant X position by using the calculated instant Y position to define an X direction center position of each sensing electrode and calculate the instant X position based on a weighted average of all the X direction center positions.

30. The apparatus of any preceding embodiment, wherein said instructions when executed by the processor further perform steps comprising: calculating the Z position of the finger by measuring a total finger-induced capacitance of the touch panel.

31. The apparatus of any preceding embodiment, wherein said instructions when executed by the processor further perform steps comprising: (v) receiving measured finger position data and generating a trend of a finger movement.

32. The apparatus of any preceding embodiment, wherein generating a trend of the finger movement comprises: obtaining derivations of the obtained instant finger position in X, Y and Z directions; applying an integration window to the obtained derivations to generate an integration value; comparing the integration value to a threshold value to determine if a direction's movement exists; and generating gesture recognition output.

33. A touch panel apparatus for finger position detection, the apparatus comprising: (a) a touch panel having a plurality of capacitive sensing electrodes configured to output signals on a plurality of output channels, wherein an output signal level on an output channel denotes channel response for that channel; (b) a digital filter circuit connected to the output channels which transforms signals received from the output channels into a filtered subset by performing steps comprising: (i) acquiring a signal from each of the output channels; (ii) comparing signal level for each channel to a low-level threshold and filtering out any signal having a level below the low-level threshold, wherein a filtered set of signals remains; (iii) identifying a peak signal in the filtered set of signals, wherein a peak signal comprises a signal that both preceded and followed by a signal having a lower level; (iv) assigning the peak signal and said preceding and following signals to a group; (v) assigning additional preceding or following signal to the group if said additional signal has a level lower than or equal to the level of an immediately adjacent signal; (vi) fitting the filtered out signals and the signals in the group to a curve and measuring slope of the fitted curve; (vii) designating the group as valid if at least one channel response in the group meets or exceeds a peak response threshold and the channel responses in the group has an average slope that meets or exceeds a defined slope threshold; and (viii) outputting the valid signal groups as a filtered subset of the signals from the output channel; (c) wherein said digital filter circuit comprises a computer processor circuit and memory storing instructions executable by the computer processor circuit to perform steps (i) through (viii).

34. A touch panel apparatus for finger position detection, the apparatus comprising: (a) a touch panel having a plurality of capacitive sensing electrodes configured to output signals on a plurality of output channels, wherein an output signal level on an output channel denotes channel response for that channel; (b) a digital filter circuit connected to the output channels which transforms signals received from the output channels into a filtered subset by performing steps comprising: (i) acquiring a signal from each of the output channels; (ii) comparing signal level for each channel to a low-level threshold and filtering out any signal having a level below the low-level threshold, wherein a filtered set of signals remains; (iii) identifying a peak signal (n) in the filtered set of signals, wherein a peak signal comprises a signal that both preceded by (n−x) and followed by (n+x) a signal having a lower level, where x is an integer 1, 2, 3, . . . ; (iv) assigning the peak signal (n) and said preceding (n−x) and following (n+x) signals to a group; (v) incrementing x; (vii) if signal level for a preceding or following signal is less than or equal to the previous signal level, adding that signal to the group; (viii) repeating steps (v) and (viii) until the group is complete; (ix) fitting the filtered out signals and the signals in the group to a curve and measuring slope of the fitted curve; (x) designating the group as valid if at least one channel response in the group meets or exceeds a peak response threshold and the channel responses in the group has an average slope that meets or exceeds a defined slope threshold; and (xi) outputting the valid signal groups as a filtered subset of the signals from the output channel; (c) wherein said digital filter circuit comprises a computer processor circuit and memory storing instructions executable by the computer processor circuit to perform steps (i) through (xi).

35. A filter for a touch panel, comprising: (a) an interface circuit configured to interface with a touch panel having a plurality of capacitive sensing electrodes configured to output signals on a plurality of output channels, wherein an output signal level on an output channel denotes channel response for that channel; (b) a computer processor circuit and memory storing instructions executable by the computer processor circuit to perform steps comprising: (i) acquiring a signal from each of the output channels; (ii) comparing signal level for each channel to a low-level threshold and filtering out any signal having a level below the low-level threshold, wherein a filtered set of signals remains; (iii) identifying a peak signal in the filtered set of signals, wherein a peak signal comprises a signal that both preceded and followed by a signal having a lower level; (iv) assigning the peak signal and said preceding and following signals to a group; (v) assigning additional preceding or following signal to the group if said additional signal has a level lower than or equal to the level of an immediately adjacent signal; (vi) fitting the filtered out signals and the signals in the group to a curve and measuring slope of the fitted curve; (vii) designating the group as valid if at least one channel response in the group meets or exceeds a peak response threshold and the channel responses in the group has an average slope that meets or exceeds a defined slope threshold; and (viii) outputting the valid signal groups as a filtered subset of the signals from the output channel.

36. A filter for a touch panel, comprising: (a) an interface circuit configured to interface with a touch panel having a plurality of capacitive sensing electrodes configured to output signals on a plurality of output channels, wherein an output signal level on an output channel denotes channel response for that channel; (b) a computer processor circuit and memory storing instructions executable by the computer processor circuit to perform steps comprising: (i) acquiring a signal from each of the output channels; (ii) comparing signal level for each channel to a low-level threshold and filtering out any signal having a level below the low-level threshold, wherein a filtered set of signals remains; (iii) identifying a peak signal (n) in the filtered set of signals, wherein a peak signal comprises a signal that both preceded by (n−x) and followed by (n+x) a signal having a lower level, where x is an integer 1, 2, 3, . . . ; (iv) assigning the peak signal (n) and said preceding (n−x) and following (n+x) signals to a group; (v) incrementing x; (vii) if signal level for a preceding or following signal is less than or equal to the previous signal level, adding that signal to the group; (viii) repeating steps (v) and (viii) until the group is complete; (ix) fitting the filtered out signals and the signals in the group to a curve and measuring slope of the fitted curve; (x) designating the group as valid if at least one channel response in the group meets or exceeds a peak response threshold and the channel responses in the group has an average slope that meets or exceeds a defined slope threshold; and (xi) outputting the valid signal groups as a filtered subset of the signals from the output channel.

37. A method for finger position detection using any of the previous embodiments or elements disclosed therein.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for finger position detection, the apparatus comprising:
   (a) a touch panel having a plurality of capacitive sensing electrodes configured to output signals on a plurality of output channels, wherein an output signal level on an output channel is associated with a channel response for that channel;
   (b) a digital filter coupled to the output channels, the digital filter configured to transform signals received from the output channels into a filtered subset by performing steps comprising:
   (i) categorizing the channel responses into one or more groups: (ii) applying one or more criteria to the one or more groups; and (iii) filtering out any groups that do not meet the one or more criteria;
   (c) wherein categorizing the channel responses into one or more groups comprises:
   acquiring a signal from each of the output channels; comparing signal level for each channel to a low-level threshold and filtering out any signal having a level below the low-level threshold such that a filtered set of signals remains; identifying a peak signal in the filtered set of signals, wherein a peak signal comprises a signal that is both preceded and followed by a signal having a lower level; and assigning the peak signal and neighboring signals to a group; and
   (d) wherein assigning the peak signal and neighboring signals to a group comprises: assigning the peak signal and said preceding signal and following signal to a group; and assigning any additional preceding signals or following signals to the group when said additional preceding signals or following signals have a level lower than or equal to the level of an immediately adjacent signal.

2. The apparatus of claim 1, further comprising:
   at least one instant position calculation module for calculating a position of a finger touching or above the touch panel.

3. The apparatus of claim 2, wherein the plurality of capacitive sensing electrodes comprises pairs of adjacent upper sensing electrodes and lower sensing electrodes; and wherein the at least one instant position calculation module is configured to calculate the position of the finger by performing steps comprising:

calculating an instant Y position by comparing channel responses of upper sensing electrodes and channel responses of lower sensing electrodes; and calculating an instant X position by using the calculated instant Y position to define an X direction center position of each sensing electrode and calculate the instant X position based on a weighted average of all the X direction center positions.

4. The apparatus of claim 3, wherein the instant position calculation module is further configured to calculate the Z position of the finger by performing steps comprising:

measuring a total finger-induced capacitance of the touch panel.

5. The apparatus of claim 2, further comprising:

a gesture recognition model configured to receive measured finger position data and generate a trend of a finger movement.

6. An apparatus for finger position detection, the apparatus comprising:

(a) a touch panel having a plurality of capacitive sensing electrodes configured to output signals on a plurality of output channels, wherein an output signal level on an output channel is associated with a channel response for that channel;

(b) a digital filter coupled to the output channels, the digital filter configured to transform signals received from the output channels into a filtered subset by performing steps comprising:

(i) categorizing the channel responses into one or more groups; (ii) applying one or more criteria to the one or more groups; and (iii) filtering out any groups that do not meet the one or more criteria;

(c) wherein categorizing the channel responses into one or more groups comprises:

acquiring a signal from each of the output channels; comparing signal level for each channel to a low-level threshold and filtering out any signal having a level below the low-level threshold such that a filtered set of signals remains; identifying a peak signal in the filtered set of signals, wherein a peak signal comprises a signal that is both preceded and followed by a signal having a lower level; and assigning the peak signal and neighboring signals to a group; and (d) wherein applying one or more criteria to the one or more groups comprises: fitting the filtered out signals and the signals in the group to a curve and measuring slope of the fitted curve; and designating the group as valid when at least one channel response in the group meets or exceeds a peak response threshold and the channel responses in the group has an average slope that meets or exceeds a defined slope threshold.

7. The apparatus of claim 6, wherein filtering out any groups that do not meet the one or more criteria comprises outputting any valid signal groups as a filtered subset of the signals from the output channel.

8. The apparatus of claim 7, wherein said digital filter comprises a computer processor and memory storing instructions executable by the computer processor circuit to perform steps (i) through (iii).

9. The apparatus of claim 6, further comprising:

at least one instant position calculation module for calculating a position of a finger touching or above the touch panel.

10. The apparatus of claim 9, wherein the plurality of capacitive sensing electrodes comprises pairs of adjacent upper sensing electrodes and lower sensing electrodes; and wherein the at least one instant position calculation module is configured to calculate the position of the finger by performing steps comprising:

calculating an instant Y position by comparing channel responses of upper sensing electrodes and channel responses of lower sensing electrodes; and calculating an instant X position by using the calculated instant Y position to define an X direction center position of each sensing electrode and calculate the instant X position based on a weighted average of all the X direction center positions.

11. The apparatus of claim 10, wherein the instant position calculation module is further configured to calculate the Z position of the finger by performing steps comprising:

measuring a total finger-induced capacitance of the touch panel.

12. The apparatus of claim 9, further comprising:

a gesture recognition model configured to receive measured finger position data and generate a trend of a finger movement.

13. An apparatus for finger position detection, the apparatus comprising:

(a) a touch panel having a plurality of capacitive sensing electrodes configured to output signals on a plurality of output channels, wherein an output signal level on an output channel is associated with a channel response for that channel;

(b) a digital filter coupled to the output channels, the digital filter configured to transform signals received from the output channels into a filtered subset by performing steps comprising:

(i) categorizing the channel responses into one or more groups: (ii) applying one or more criteria to the one or more groups; and (iii) filtering out any groups that do not meet the one or more criteria;

(c) at least one instant position calculation module for calculating a position of a finger touching or above the touch panel; and (d) a gesture recognition model configured to receive measured finger position data and generate a trend of a finger movement; (e) wherein the gesture recognition module is configured to generate a trend of the finger movement by performing steps comprising: obtaining derivations of the obtained instant finger position in X, Y and Z directions; applying an integration window to the obtained derivations to generate an integration value; comparing the integration value to a threshold value to determine when a direction's movement exists; and generating gesture recognition output.

14. The apparatus of claim 13, wherein the plurality of capacitive sensing electrodes comprises pairs of adjacent upper sensing electrodes and lower sensing electrodes; and wherein the at least one instant position calculation module is configured to calculate the position of the finger by performing steps comprising:

calculating an instant Y position by comparing channel responses of upper sensing electrodes and channel responses of lower sensing electrodes; and calculating an instant X position by using the calculated instant Y position to define an X direction center position of each sensing electrode and calculate the instant X position based on a weighted average of all the X direction center positions.

15. The apparatus of claim 14, wherein the instant position calculation module is further configured to calculate the Z position of the finger by performing steps comprising:

measuring a total finger-induced capacitance of the touch panel.

16. An apparatus for finger position detection, the apparatus comprising:
(a) a touch panel having a plurality of capacitive sensing electrodes configured to output signals on a plurality of output channels, wherein an output signal level on an output channel is associated with a channel response for that channel; and
(b) a processor coupled to the output channels,
(c) a non-transitory memory storing instructions executable by the processor;
(d) wherein said instructions, when executed by the processor, are configured to transform signals received from the output channels into a filtered subset by performing steps comprising:
  (i) categorizing the channel responses into one or more groups;
  (ii) applying one or more criteria to the one or more groups; and
  (iii) filtering out any groups that do not meet the one or more criteria;
(e) wherein categorizing the channel responses into one or more groups comprises:
  acquiring a signal from each of the output channels;
  comparing signal level for each channel to a low-level threshold and filtering out any signal having a level below the low-level threshold such that a filtered set of signals remains;
  identifying a peak signal in the filtered set of signals, wherein a peak signal comprises a signal that is both preceded and followed by a signal having a lower level; and
  assigning the peak signal and neighboring signals to a group.

17. The apparatus of claim 16, wherein assigning the peak signal and neighboring signals to a group comprises: assigning the peak signal and said preceding signal and following signal to a group; and assigning any additional preceding signals or following signals to the group when said additional preceding signals or following signals have a level lower than or equal to the level of an immediately adjacent signal.

18. The apparatus of claim 16, wherein applying one or more criteria to the one or more groups comprises: fitting the filtered out signals and the signals in the group to a curve and measuring slope of the fitted curve; and designating the group as valid when at least one channel response in the group meets or exceeds a peak response threshold and the channel responses in the group has an average slope that meets or exceeds a defined slope threshold.

19. The apparatus of claim 18, wherein filtering out any groups that do not meet the one or more criteria comprises outputting any valid signal groups as a filtered subset of the signals from the output channel.

20. The apparatus of claim 16, wherein said instructions when executed by the processor further perform steps comprising:
calculating a position of a finger touching or above the touch panel.

21. The apparatus of claim 20, wherein the plurality of capacitive sensing electrodes comprises pairs of adjacent upper sensing electrodes and lower sensing electrodes; and wherein said instructions when executed by the processor further perform steps comprising:

calculating an instant Y position by comparing channel responses of upper sensing electrodes and channel responses of lower sensing electrodes; and
calculating an instant X position by using the calculated instant Y position to define an X direction center position of each sensing electrode and calculate the instant X position based on a weighted average of all the X direction center positions.

22. The apparatus of claim 21, wherein said instructions when executed by the processor further perform steps comprising:
calculating the Z position of the finger by measuring a total finger-induced capacitance of the touch panel.

23. The apparatus of claim 20, wherein said instructions when executed by the processor further perform steps comprising:
receiving measured finger position data and generating a trend of a finger movement.

24. The apparatus of claim 16, wherein categorizing the channel responses into one or more groups comprises:
acquiring a signal from each of the output channels;
comparing signal level for each channel to a low-level threshold and filtering out any signal having a level below the low-level threshold such that a filtered set of signals remains;
identifying a peak signal in the filtered set of signals, wherein a peak signal comprises a signal that is both preceded and followed by a signal having a lower level; and
assigning the peak signal and neighboring signals to a group.

25. An apparatus for finger position detection, the apparatus comprising:
(a) a touch panel having a plurality of capacitive sensing electrodes configured to output signals on a plurality of output channels, wherein an output signal level on an output channel is associated with a channel response for that channel;
(b) a processor coupled to the output channels;
(c) a non-transitory memory storing instructions executable by the processor;
(d) wherein said instructions, when executed by the processor, are configured to transform signals received from the output channels into a filtered subset by performing steps comprising:
  (i) categorizing the channel responses into one or more groups; (ii) applying one or more criteria to the one or more groups; and (iii) filtering out any groups that do not meet the one or more criteria;
(e) wherein said instructions when executed by the processor further perform steps comprising calculating a position of a finger touching or above the touch panel;
(f) wherein said instructions when executed by the processor further perform steps comprising receiving measured finger position data and generating a trend of a finger movement; and
(g) wherein generating a trend of the finger movement comprises: obtaining derivations of the obtained instant finger position in X, Y and Z directions; applying an integration window to the obtained derivations to generate an integration value; comparing the integration value to a threshold value to determine when a direction's movement exists; and generating gesture recognition output.

26. The apparatus of claim 25, wherein categorizing the channel responses into one or more groups comprises:
   acquiring a signal from each of the output channels;
   comparing signal level for each channel to a low-level threshold and filtering out any signal having a level below the low-level threshold such that a filtered set of signals remains;
   identifying a peak signal in the filtered set of signals, wherein a peak signal comprises a signal that is both preceded and followed by a signal having a lower level; and
   assigning the peak signal and neighboring signals to a group.

27. The apparatus of claim 25, wherein the plurality of capacitive sensing electrodes comprises pairs of adjacent upper sensing electrodes and lower sensing electrodes; and wherein said instructions when executed by the processor further perform steps comprising:
   calculating an instant Y position by comparing channel responses of upper sensing electrodes and channel responses of lower sensing electrodes; and
   calculating an instant X position by using the calculated instant Y position to define an X direction center position of each sensing electrode and calculate the instant X position based on a weighted average of all the X direction center positions.

28. The apparatus of claim 27, wherein said instructions when executed by the processor further perform steps comprising:
   calculating the Z position of the finger by measuring a total finger-induced capacitance of the touch panel.

* * * * *